United States Patent
Reshef et al.

(10) Patent No.: US 9,992,448 B2
(45) Date of Patent: *Jun. 5, 2018

(54) RECORDING WEB CONFERENCES

(71) Applicant: Gong I.O Ltd., Herzliya (IL)

(72) Inventors: Eilon Reshef, Tel Aviv (IL); Amit Bendov, Kadima (IL)

(73) Assignee: GONG I.O LTD., Herzliya (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/602,127

(22) Filed: May 23, 2017

(65) Prior Publication Data

US 2017/0257598 A1    Sep. 7, 2017

Related U.S. Application Data

(63) Continuation of application No. 15/275,397, filed on Sep. 25, 2016, now Pat. No. 9,699,409.

(60) Provisional application No. 62/296,107, filed on Feb. 17, 2016.

(51) Int. Cl.
| | |
|---|---|
| *H04N 7/15* | (2006.01) |
| *H04N 7/14* | (2006.01) |
| *G06F 3/0484* | (2013.01) |
| *H04L 29/06* | (2006.01) |

(52) U.S. Cl.
CPC .......... *H04N 7/147* (2013.01); *G06F 3/0484* (2013.01); *H04L 65/1089* (2013.01); *H04L 65/4015* (2013.01); *H04N 7/15* (2013.01); *H04N 7/155* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 5,588,139 | A | * 12/1996 | Lanier | G06F 3/011 703/1 |
| 2009/0144579 | A1 | 6/2009 | Swanson | |
| 2011/0107236 | A1 | 5/2011 | Sambhar | |
| 2013/0332477 | A1 | * 12/2013 | Nagai | G06F 17/30684 707/758 |
| 2014/0254820 | A1 | * 9/2014 | Gardenfors | H04R 3/005 381/80 |
| 2014/0368601 | A1 | * 12/2014 | deCharms | H04W 4/021 348/14.02 |
| 2015/0025891 | A1 | * 1/2015 | Goldberg | G10L 13/033 704/260 |
| 2016/0150184 | A1 | * 5/2016 | Gandhi | H04N 7/15 348/14.08 |
| 2016/0203127 | A1 | * 7/2016 | Uszkoreit | G06F 17/289 704/277 |

OTHER PUBLICATIONS

International Application # PCT/IB2017/050336 Search Report dated May 4, 2017.

* cited by examiner

*Primary Examiner* — Creighton Smith
(74) *Attorney, Agent, or Firm* — D. Kligler IP Services Ltd.

(57) ABSTRACT

Conference recording is carried out by identifying a virtual conference operated by a conferencing system connected to a communications network. A virtual participant process executing in a processor is registered with the conferencing system as a co-participant in the virtual conference. Information streams produced by the human participants are recorded and distributed with the virtual participant process.

18 Claims, 6 Drawing Sheets

RECORDING WEB CONFERENCES

CROSS-REFERENCE TO RELATED APPLICATIONS

This application is a continuation of application Ser. No. 15/275,397, filed 25 Sep. 2016, which claims the benefit of U.S. Provisional Application No. 62/296,107, filed 17 Feb. 2016, all of which are herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to arrangements for multi-party conferencing. More particularly, this invention relates to documentation of virtual conferences over data networks.

2. Description of the Related Art

Virtual meetings are now widely popular as an alternative for face-to-face meetings. For example, programs such as Skype® offer basic videoconferencing and screen sharing tools. Other programs including WebEx®, Zoom®, Join.Me® and GoToMeeting® offer the ability to share multiple screens, add annotations and control a computer desktop.

The need to document virtual meetings has been recognized. For example, U.S. Patent Application Publication No. 2015/0244749 proposes a system for managing a virtual meeting. By suitably configuring a graphical user interface a recording of audio and video data from the virtual meeting may be made accessible.

SUMMARY OF THE INVENTION

According to disclosed embodiments of the invention, virtual meetings can be unintrusively recorded, transparently to the participants. A virtual participant emulates a human attendee, logging into a meeting supported by a conventional videoconferencing program. The virtual participant is tasked with listening, storing, aggregating and organizing a stream multimedia data that is presented by the participants during the virtual conference. The virtual participant can also actively participate in the meeting by injecting sound and textual notifications and by interactively responding to requests made by the human participants through the video conferencing software in the form of voice or chat commands.

There is provided according to embodiments of the invention a method of conference recording, which is carried out by identifying a virtual conference operated by a conferencing system connected to a communications network. The method is further carried out by executing a virtual participant process in a processor, registering the virtual participant process with the conferencing system as a co-participant in the virtual conference, and recording information streams of the human participants with the virtual participant process.

According to an aspect of the method, executing a virtual participant process is accomplished by spawning a virtual machine in the processor and executing the virtual participant process in the virtual machine.

One aspect of the method includes executing a recording component process, which is cooperative with the virtual participant process to receive the information streams.

According to a further aspect of the method, the virtual participant process is operative to record an event occurring in the virtual conference and to communicate with one or more of the human participants responsively to the event.

Still another aspect of the method includes transmitting an output of the recording component to one or more of the human participants during the virtual conference.

According to an additional aspect of the method, the output of the recording component is accessible during the virtual conference to entities that are not participants in the virtual conference.

According to another aspect of the method, the virtual participant process is operative to execute a response to commands from one of the human participants.

According to still another aspect of the method, the response includes a transmission into the virtual conference of at least one of a sound notification, a textual notification, and a report of requested information.

In still another aspect of the method the human participants include a dynamically selected active speaker. The method includes identifying the active speaker with the virtual participant process, and associating a current one of the information streams with the active speaker.

According to yet another aspect of the method, the conferencing system is operative to generate an indication of the active speaker, and identifying the active speaker includes recognizing the indication.

According to one aspect of the method, registering the virtual participant process with the conferencing system is performed by emulating human interactions with a graphical user interface.

According to a further aspect of the method, registering the virtual participant process is performed by modifying at least one of a registry entry, a configuration file, and an internal database in the conferencing system.

An additional aspect of the method the virtual participant process is operative for recording information streams in a plurality of multimedia channels and combining the recorded information streams into a common stream.

Another aspect of the method includes concurrently executing a plurality of virtual participant processes in respective virtual conferences.

There is further provided according to embodiments of the invention a method, which is carried out by obtaining a schedule of virtual conferences, spawning respective virtual machines to provide virtual participant processes for a portion of the virtual conferences in the schedule, and while monitoring performance of the virtual machines during the virtual conferences, detecting a failure of one of the virtual machines to perform in accordance with a predefined standard, and thereafter terminating the one virtual machine and launching a replacement virtual machine.

An aspect of the method includes determining that one of the virtual conferences has completed, and thereafter reassigning the virtual machine thereof to a new conference.

There is further provided according to embodiments of the invention a system including a server connected to a communications network and a recording component linked to the server. The server is operative for identifying a virtual conference operated by a conference server connected to the communications network, spawning a virtual machine, executing a virtual participant process in the virtual machine, and registering the virtual participant process with the conference server as a co-participant in the virtual conference. The recording component is cooperative with the server for recording information streams of the human participants using the virtual participant process.

According to another aspect of the system, the server is operative during the virtual conference for transmitting an output of the recording component to one or more of the human participants.

According to an additional aspect of the system, the output of the recording component is made accessible during the virtual conference to entities that are not participants in the virtual conference.

According to a further aspect of the system, the server is operative for obtaining a schedule of virtual conferences, spawning respective virtual machines to provide virtual participant processes for a portion of the virtual conferences in the schedule, monitoring performance of the virtual machines during the virtual conferences to detect a failure of one of the virtual machines to perform in accordance with a predefined standard, terminating the one virtual machine and launching a replacement virtual machine.

According to one aspect of the system the server is operative for determining that one of the virtual conferences has completed, and thereafter reassigning the virtual machine thereof to a new conference.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Aspects of the present invention may be embodied in software programming code, which is typically maintained in permanent storage, such as a computer readable medium. In a client/server environment, such software programming code may be stored on a client or a server. The software programming code may be embodied on any of a variety of known non-transitory media for use with a data processing system, such as a USB memory, hard drive, electronic media or CD-ROM. The code may be distributed on such media, or may be distributed to users from the memory or storage of one computer system over a network of some type to storage devices on other computer systems for use by users of such other systems.

Definitions.

The terms "link", "links", "couple" and "couples" are intended to mean either an indirect or direct connection. Thus, if a first device couples to a second device, that connection may be through a direct connection, or through an indirect connection via other devices and connections.

As used herein, the term "file" should be interpreted broadly to include any type of data organization whether file-based or block-based. Further, as used herein, the term "file system" should be interpreted broadly as a programmatic entity that imposes structure on an address space of one or more physical or virtual disks so that an operating system may conveniently deal with data containers, including files and blocks.

The term "network" is intended to represent any of a variety of conventional network topologies and types (including wired and/or wireless networks), employing any of a variety of conventional network protocols (including public and/or proprietary protocols). Network may include, for example, the Internet, the public switched telephone network, as well as portions of one or more local area networks (LANs) and/or wide area networks (WANs).

The terms "conference" and "virtual conference" also known as a "call" or "virtual meeting", refer to a discussion or presentation involving two or more remote participants.

System Overview.

Figure 1:
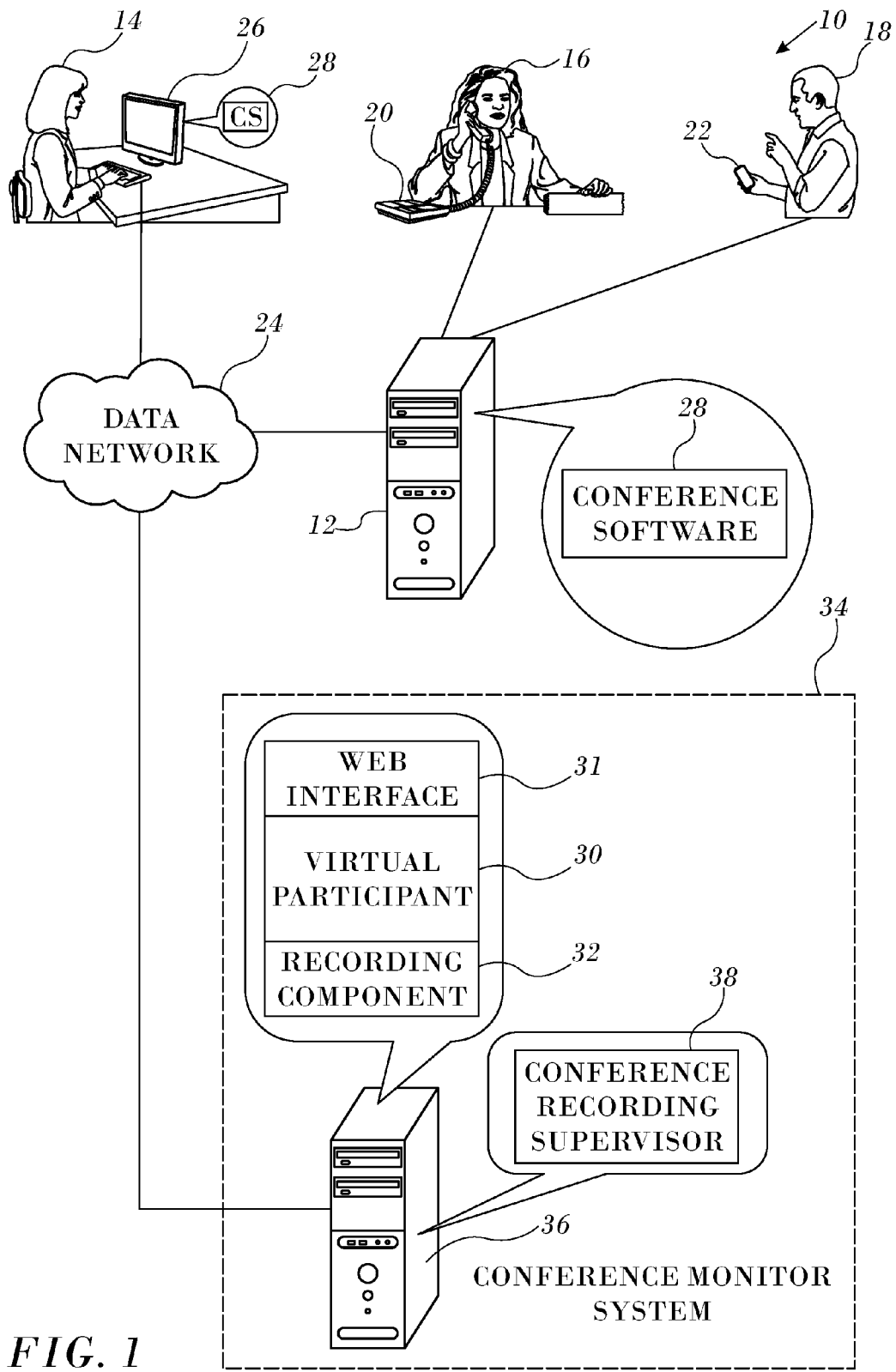
FIG. 1 is a block diagram of a system for carrying out the invention.

Turning now to the drawings, reference is initially made to FIG. 1, which is a block diagram of a system 10 that is suitable for carrying out the invention. The system 10 typically comprises one or multiple interconnected general purpose or embedded computer processors in one or multiple computers, which are programmed with suitable software for carrying out the functions described hereinbelow. Thus, although the system 10 is shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be embodied on any of a variety of known non-transitory media for use with a computer system, such as a diskette, or hard drive, or CD-ROM. The code may be distributed on such media, or may be distributed to the system 10 from the memory or storage of another computer system (not shown) over a network. Alternatively or additionally, the system 10 may comprise digital signal processors, field programmable gate arrays or hard-wired logic.

Included in the system 10 is a conferencing processor 12, which may be comprised of one or more interconnected computers. The conferencing processor 12 is accessed by any number of users, here represented by users 14, 16, 18, who participate in a virtual conference. The links between the conferencing processor 12 and the users 14, 16, 18 may involve voice transmission or voice communication over a wired telephone 20 (user 16), mobile, or wireless telephone device 22 (user 18) connected to a modem or the like in the conferencing processor 12 as shown in FIG. 1, or indirectly via a service provider (not shown) that is connected to the conferencing processor 12 via a network 24. Alternatively, there may be a link via a computing device 26 connected to the data network 24 (user 14). Indeed, any device capable of supporting a voice channel may be used to establish a direct or indirect link to the conferencing processor 12.

Conventional web conferencing software 28 is configured to host the virtual conference. It may execute on conferencing processor 12, controlled by the vendor of the conferencing software 28. Alternatively, computer-based participants, such as the user 14, may execute an instance of the conferencing software 28 (CS) on the computing device 26, or may interact via an interface or browser with the conferencing software 28 when it executes in the conferencing processor 12. The conferencing software 28 is sometimes discussed with reference to the above-noted WebEx product. This is by way of example and not of limitation, as the inventive system is operable, mutatis mutandis, with many conventional web conferencing software products.

Also involved in the conference is an autonomous conference monitoring system 34 that is implemented on one or more servers such as server 36. One component of the system 34 is a process referred to as a virtual participant 30, which emulates certain actions with respect to the conference that are conventionally performed by human participants and which are described in detail hereinbelow. The virtual participant 30 may be responsive to commands from one or more of participants, and may be provided with additional intelligence as described below. The virtual participant 30 is spawned and executed by the server 36, which is connected to the network 24 as shown in FIG. 1.

The system 34 comprises a recorder component 32 that connects to the conference in a manner explained below, and operates cooperatively with the virtual participant 30 to capture the users' activities in the conference. The recorder component 32 and the virtual participant 30 are tasked with listening, aggregating and organizing streams of data, typically multi-media data, which are presented by the participants during the virtual conference. The recorder component 32 is interoperable with conferencing software products produced by many vendors and may interact with a conferencing system that may be realized as the conferencing processor 12 using a vendor-provided application programming interface (API).

The system 34 may comprise a recording supervisor 38, which has administrative functions. The recording supervisor 38 may be operated by a different entity than the conferencing processor 12. The recording supervisor 38 conducts monitoring, reporting, testing and various other actions necessary for control and operation of the virtual participant 30 and the recorder component 32. It may concurrently control virtual participants in many conferences.

A web interface 31 may be provided in the system 34 to enable a human participant and the virtual participant 30 to interact.

Figure 2:
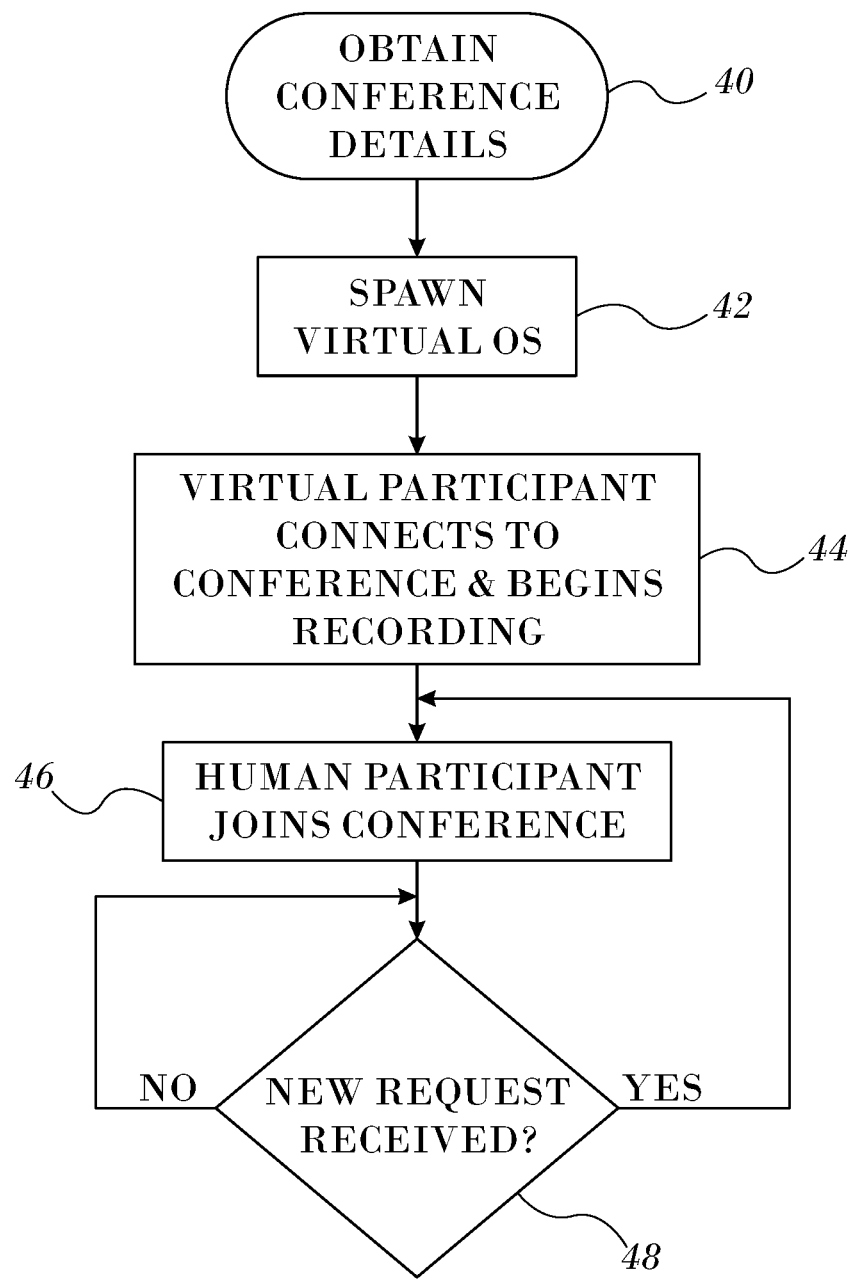
FIG. 2 is a flow chart of a method of recording a virtual conference in accordance with an embodiment of the invention.

Reference is now made to FIG. 2, which is a flow chart of a method of recording a virtual conference in accordance with an embodiment of the invention. The process steps are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

In initial step 40 the details of the conference to be recorded are obtained, such as a connection URL, phone number or host user id and optionally a password or key. Such information can be obtained, for example, from the conference provider via an API. Listing 1 is an exemplary SOAP (Simple Object Access Protocol) to obtain conference details from WebEx servers.

Alternatively, the conference details may be obtained from users, or from email invitations sent to prospective participants. Additionally or alternatively potential conference information can be obtained from users' calendar, customer relationship management (CRM) and/or call scheduling software when suitable access is granted.

Then, in step 42 an instance of a virtual operating system (OS) or virtual machine, e.g., a Windows® machine is spawned, which may have an instance of the conferencing software 28 (or a suitable interface to the conferencing software 28) preloaded. Alternatively, a real rather than virtual machine can be assigned, e.g., from a pool of idle machines, that has the conferencing software 28 preloaded. Step 42 can be performed according to the scheduled time of the conference before the first participant joins the meeting as shown in FIG. 2. Alternatively, step 42 can be performed upon recognition of the first participant, or when recordable conference activity occurs.

As will be seen, the virtual participant 30 is configured by the virtual operating system to emulate a human participant, and is specialized for monitoring activities of the conference and its participants.

The conferencing software 28 interacts with conference participants via a graphical user interface. In one embodiment this can be an emulation of a Windows application. Alternatively, a browser may be spawned and caused to connect to the web conference using browser emulation, or using the interface provided by the vendor the conferencing software 28. The recorder component 32 of the virtual participant 30 connects to the conference in step 44 as though it were an attendee (with a configurable attendee name) and commences its recording activities upon occurrence of some predefined event, e.g., a time signal, speech from the moderator, or a participant. The conference to join may be identified by a connection URL, conference number, telephone number and/or user identifier of the human host. To join the conference, the recorder component 32 emulates a set of mouse clicks, key strokes and other actions that mimic a human participant joining a virtual conference. The recorder component 32 interacts with the same user interface of the conferencing software 28 as a human user, and is interoperable with versions of conferencing software produced by many vendors. The conferencing software 28 might be unaware that the virtual participant 30 is an automated computer process rather than a transmitter of human-initiated actions. However, one or more human participants may be aware of and even control the activities of the virtual participant 30.

An HTTP proxy server or other communication interception systems suitable to the protocol used by the vendor may be utilized by the recorder component 32 to actively intercept communications to and from the conferencing processor 12 and the conferencing software 28. The proxy server may route such communications to the virtual participant 30, which can track the communications and interpose responses as needed, or modify communications directed from an originating server to the conferencing processor 12.

The recorder component 32 collects and stores text messages produced during the call, and associates them with corresponding timestamps. For example:

Assume that a participant in a web conference is having a conversation with multiple people. During the conversation the participant wants to take note of an important piece of the conversation. The participant sends a private chat message to the virtual participant 30, e.g., via a chat mechanism provided by the conferencing software 28.

The recorder component 32 receives the chat message, stores it and associates it with a timestamp. Later on, the participant can come back to listen to the recording of the call, and can access the point in time corresponding to the timestamp using a web interface.

At step 46 a new participant signs in to the conference by any of the methods discussed above.

In practice, assembling the participants in a virtual conference may be a sequential process, as shown by delay step 48 where a request to join the conference by another participant is awaited. When this occurs, control returns to step 46. It will be apparent that the virtual participant 30 may record events in the conference even though not all attendees have yet arrived.

Figure 3:
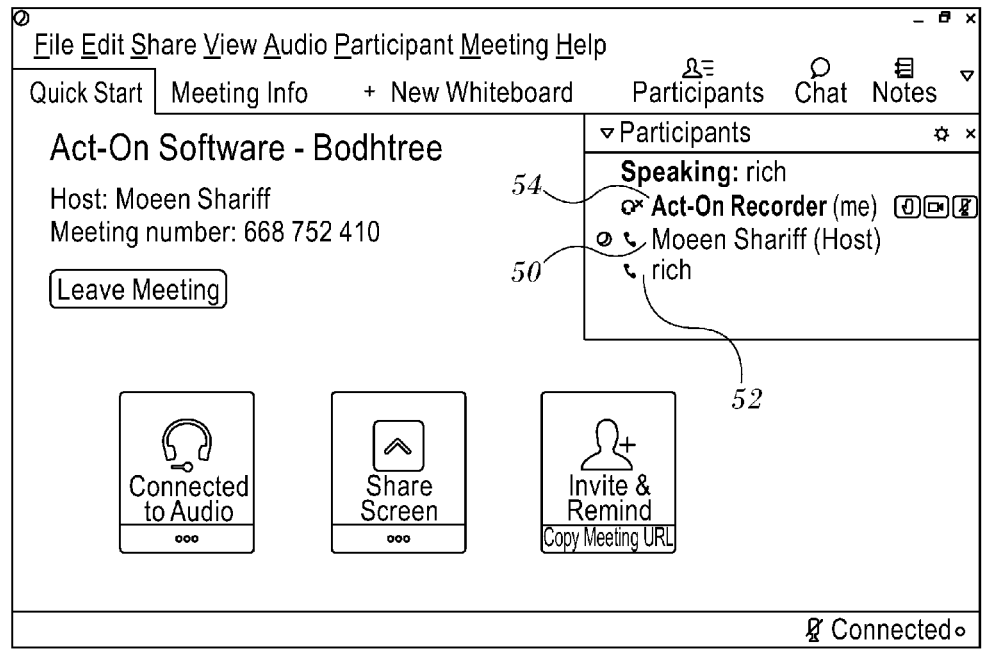
FIG. 3 is an exemplary screen display of the status of a conference in accordance with an embodiment of the invention.

Reference is now made to FIG. 3, which is an exemplary WebEx screen display of the status of a conference in accordance with an embodiment of the invention. As explained above, in order to initiate the virtual participant 30 (FIG. 1) a virtual machine is spawned and typically executes on a server that is accessible via the Internet. The virtual participant 30 does not have intrinsic audio capabilities. Instead, the recorder component 32 has an installed audio driver, which captures audio output from the conference to be recorded. In other words, the audio driver functions as a virtual sound adapter.

The recorder component 32 also has facilities for scanning the windows using known methods and reading textual material presented by the conferencing software 28, e.g., by optical character recognition. The recorder component may be provided with pattern recognition facilities and other known artificial intelligence programs in order to automate manipulation of the graphical user interface and the conferencing software 28 or to record and interpret selected portions of the windows displayed by the graphical user interface. The Java® code in Listing 2 indicates one aspect of automated control of the conferencing software 28 by closing an audio connection window.

In addition to host 50, one attendee 52, identified as "Rich", previously joined the conference as a new participant by telephone and is currently the active speaker. The virtual participant 30 (FIG. 1), indicated in FIG. 3 by an icon 54, has been spawned and is actively monitoring the proceedings, recording presentations as information streams (voice and multimedia) of both host 50 and attendee 52. The recorder component of the virtual participant 30 obtains at least a portion of its input from the virtual sound adapter described above.

Figure 4:
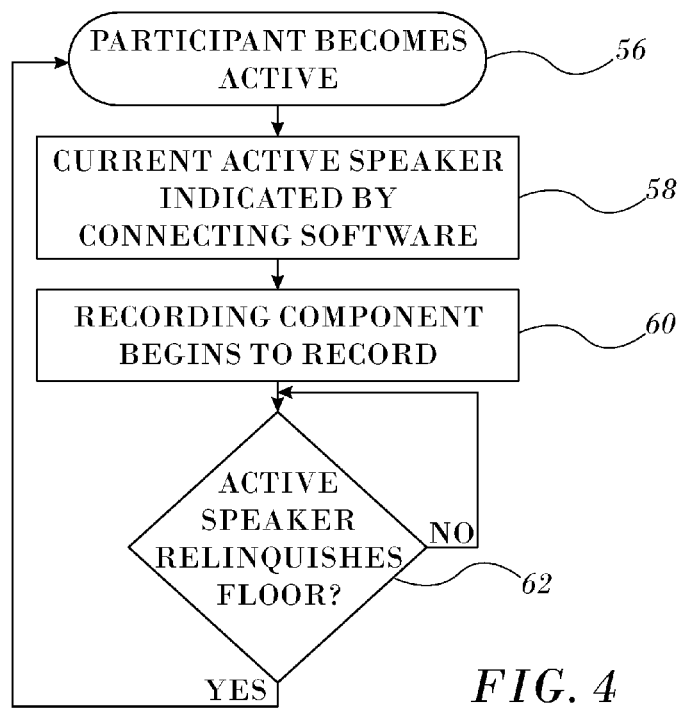
FIG. 4 is a flow chart of a method of recording on-line conferences in accordance with an embodiment of the invention.

Reference is now made to FIG. 4, which is a flow chart of a typical sequence of recording on-line conferences in accordance with an embodiment of the invention. According to the rules of a particular conference, one participant has the "floor" of the conference at any time and is designated as the active speaker. At initial step 56 one of the participants becomes the active speaker according to the rules of the particular conference and those of the conferencing software 28 (FIG. 1). For example, some participants may have observer status, and only become active on request, while other participants are privileged to speak at any time during the meeting. The conferencing software 28 displays the active speaker at step 58. The announcement is sensed at step 60 by the virtual participant 30, which registers the speech time and duration. Additionally or alternatively, multimedia productions may be recorded by the virtual participant 30.

In other conferences it is common for multiple participants to speak concurrently. The virtual participant 30 may receive multiplexed audio, and is capable of capturing audio signals and tracking the concurrently speaking participants.

After a delay step 62 the active speaker eventually relinquishes the floor of the virtual conference. An indication of this event is presented by the conferencing software 28. The virtual participant, which continues to scan the windows or other data produced by the conferencing software 28, notes that the current participant is no longer the active speaker. Control then returns to initial step 56. After the recording is complete, the audio and the video may be re-compressed using a lossless algorithm to ensure no loss of information and loaded to the cloud for further processing. Transfer of the compressed data to the cloud may occur at any time, for example, in real time as the attendees are speaking. Alternatively, the transfer may occur after the conference ends.

Figure 5:
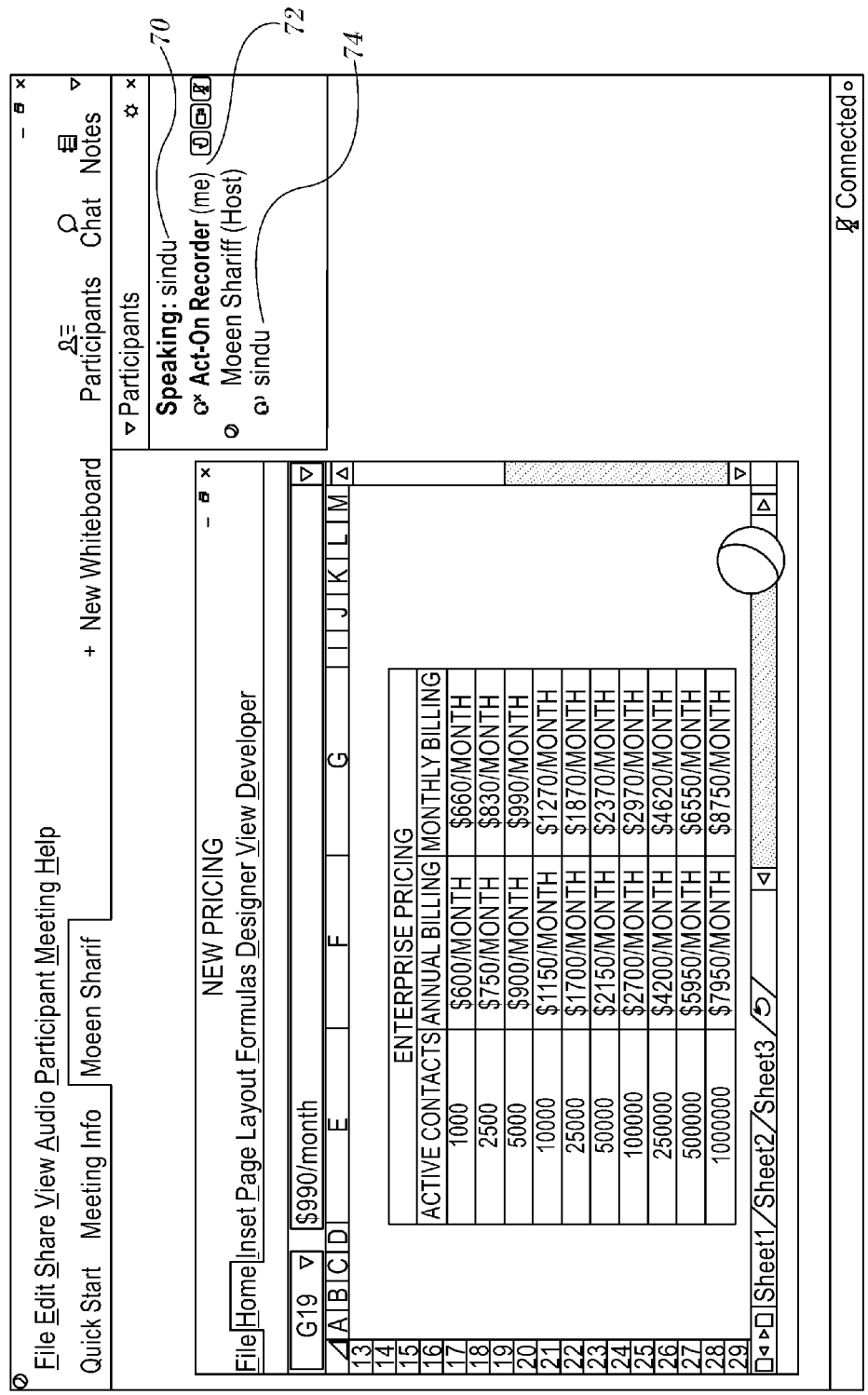
FIG. 5 is a screen display illustrating participant recording and content selection in accordance with an embodiment of the invention.

Reference is now made to FIG. 5, which is an example of participant recording and content selection on a screen display presented by the conferencing software 28 (FIG. 1) during the course of a conference in accordance with an embodiment of the invention. Different conferencing software may provide other formats and indications of the active speaker. Based on a textual indication 70 provided by the conferencing software 28, the virtual participant 30 (indicated in FIG. 5 by icon 72) identifies participant Sindu 74 as being the active speaker. Relevant locations on the screen are identified by indications from the conferencing software 28 (FIG. 1). Additionally or alternatively the relevant indications can be derived from the layout of the windows, from window names or class names, from text displayed within the window, or from the structure of an HTML page displayed within a browser window. Alternatively, the virtual participant 30 may record the entire screen for processing off line. In any case the virtual participant 30 records speech of participant Sindu 74.

During the conference the recorder component 32 of the virtual participant 30 records both audio and video data and compress them on the fly. As noted above, the recorder component 32 creates a virtual sound driver or adaptor that the conferencing software application "plays" to, and listens to the sound adaptor of the recorder component 32. The recorder component 32 monitors the application, enabling the virtual participant 30 to detect a variety of normal and abnormal conditions that may depend on the application, for example:

(1) The host joined or left the conference.

(2) Video conferencing started or ended.

(3) The conference terminated abruptly.

(4) The virtual participant was ejected from of the conference (perhaps to protect a private discussion).

At the end of the conference the resulting recorded media and the meta-data accumulated during the call are transferred by the recording component 32 to permanent storage such as database, file system or distributed storage facility (e.g. Amazon S3).

Using the recorder component 32 the virtual participant 30 may listen to the audio channel to detect start and end of the conference based on silence, or the sounds of people joining and leaving.

Figure 6:
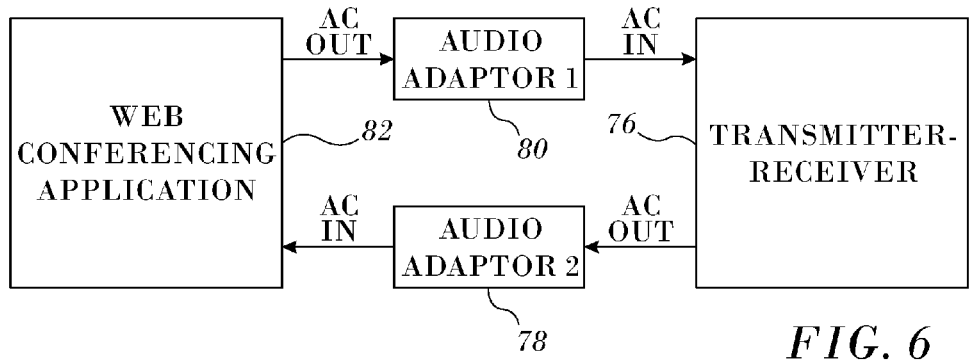
FIG. 6 is a block diagram illustrating the operation of a recording component in accordance with an embodiment of the invention.

Reference is now made to FIG. 6, which is a block diagram illustrating the operation of a recording component in accordance with an embodiment of the invention. Transmitter-receiver 76 is connected to virtual audio adaptors 78, 80, which in turn link to conferencing software 82. Audio input to be recorded is received in the transmitter-receiver 76 via virtual audio adaptor 80. Audio output is transmitted from the transmitter-receiver 76 to manipulate the conferencing software 82 via transmitter-receiver 76. Participation by a virtual participant in a conference may comprise announcements such as "Welcome, I'm the virtual participant", or "Your call is recorded". Additionally or alternatively the virtual participant may present recorded material such as templates.

When it starts recording, each recording component enables a real-time communication channel that provides metadata about the call, e.g., the number of participants as well as access to the audio and video stream. Audio is typically compressed, e.g., to FLAC or MP3 format in order to support playing in standard web browsers. Near real-time speech recognition can be applied to provide alerts to users. For example, significant words such as "competition". Transmitter-receivers may also be configured to "speak" to the conference. The recording component may make its output available during the conference, with minimal delay to all the human participants, and optionally to outside entities that are not participants in the conference.

Figure 7:
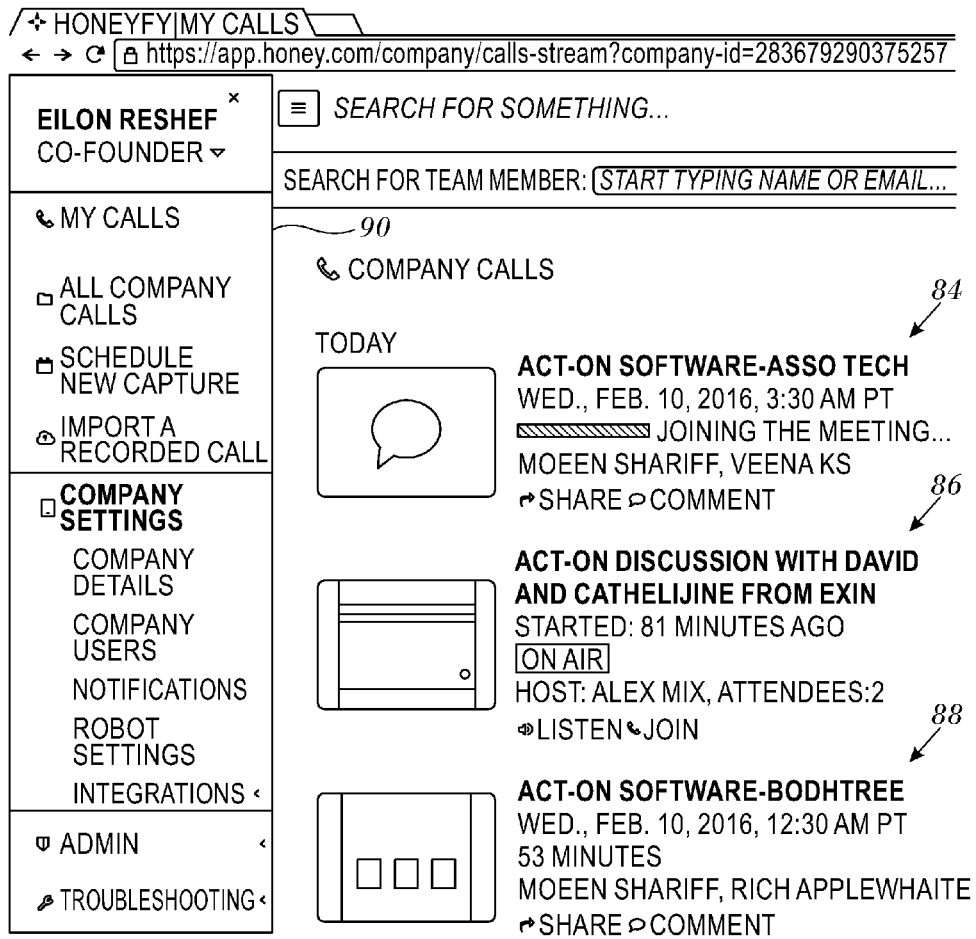
FIG. 7 is a screen display that illustrates organization of recording component activities in a plurality of conferences in accordance with an embodiment of the invention.

The recording component in a conference may aid management of a conferencing server or web site. Reference is now made to FIG. 7, which is a screen display that illustrates organization of the activities of recording components in a plurality of conferences in accordance with an embodiment of the invention. The status of conferences 84, 86, 88 is displayed in the right portion of the screen. Further details and configuration options for the conferencing software are available from the selection in left pane 90. When recording is in progress, managers can listen to and view the proceedings live.

Figure 8:
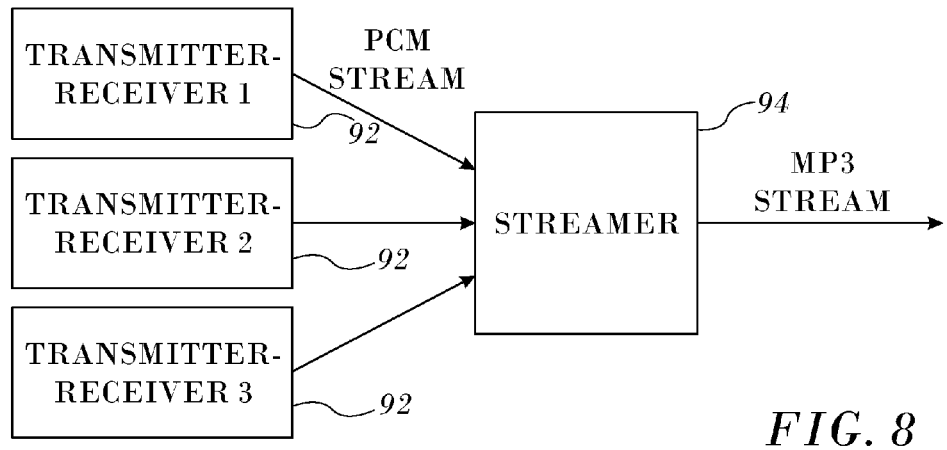
FIG. 8 is a block diagram illustrating an aspect of the recording component operations in accordance with an embodiment of the invention.

Reference is now made to FIG. 8, which is a block diagram illustrating an aspect of recording component operations in accordance with an embodiment of the invention. Each transmitter-receiver 92 may emit respective audio streams modulated by any suitable protocol, e.g., pulse code modulation (PCM). The streams may then be transmitted to a web user (not shown) as an MP3 stream, which can be used, for example by managers as described above with respect to FIG. 7. A streamer 94 may provide an indication of the current speaker and other metadata in an additional non-audio stream. Similarly, in another embodiment each transmitter-receiver 92 may emit video streams, which are then transmitted to a web user as a set of images or as a continuous video stream encoded using a protocol such as MP4, which can be used to view the screen share in real time.

Figure 9:
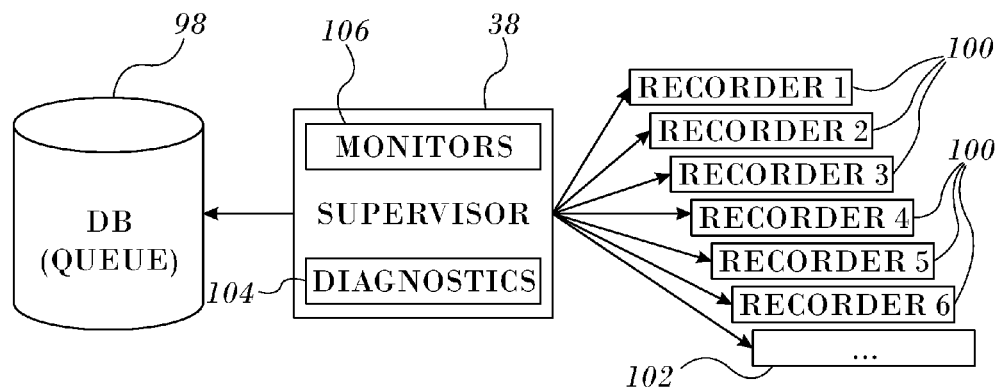
FIG. 9 is a block diagram illustrating supervisory aspects of recording component operations in accordance with an embodiment of the invention.

The system 10 (FIG. 1) is designed to scale up, limited only by the capacity of the hardware. Reference is now made to FIG. 9, which is a block diagram illustrating detailed functions carried out by the recording supervisor 38 (FIG. 1) in the system in accordance with an embodiment of the invention. In this embodiment the recording supervisor 38, typically executing on server 36 (FIG. 1) monitors a queue of incoming calls in a memory 98, and launches new virtual operating systems with their recording components 100. Recording supervisor 38 loads machines as needed using an Infrastructure as a Service (IaaS) cloud or data-center API, e.g., Amazon EC2, OpenStack or VMWare, and may provision extra instances of the virtual operating system, represented in FIG. 9 by recording component 102. Recording supervisor 38 monitors the virtual operating systems to ensure they load properly, and if not, replaces them.

When a virtual operating system loads, it starts a sequence of setup and provisioning steps that prepares the virtual machine for operation as the virtual participant 30, and may update the software on the virtual machine to the latest version, particularly the recorder software. Recording components 100 become operational when the virtual participant 30 joins the conference and records events as described above. The recording supervisor 38 and the recording components 100 may be distributed across multiple networks (FIG. 1) and can be replicated to servers in multiple geographic regions in order to provide a fail-safe operation and decrease latency for users around the world.

The recording supervisor 38 includes diagnostic subsystem 104 and monitoring subsystem 106 that monitors progress of the virtual operating systems and the recording components 100. The monitoring subsystem 106 receives current updates and diagnostic information that is processed by the diagnostic subsystem 104 from the recording components 100, assesses system health, and intervenes in operations when errors are detected. The recording supervisor 38 continuously:

(1) checks whether new virtual machines need to be spawned, and does so as needed;

(2) checks whether existing virtual machines are "stuck" (halted) or otherwise are failing to perform with a predefined standard. If so, the recording supervisor 38 replaces them with newly spawned machines;

(3) checks whether any the operation of virtual machines are complete, and terminates them accordingly. For example, termination may result from an absence of audio input for a predetermined period, or exit of all the participants from the conference. Such events may cause the virtual participant 30 to disconnect from the conference; and (4) checks whether any recording component 100 can be reused for a subsequent conference and if so—refrains from shutting it down and instead assigns it a new role. In addition, the supervisor component receives the data collected by the recorders, i.e., the success or failure of the call, its metadata such as duration, list of participants (typically tracked and updated in real-time), as well as pointers, e.g., URLs to the actual video and audio files that may be referenced in the conference.

When launching new virtual machines, the recording supervisor 38 may decide which machines and machine types to launch based on the schedule of the conferences as well as on the technical capabilities required and cost. For example, the recording supervisor may decide to launch an Amazon Spot Instance (priced lower than other options). It may also launch different recorder systems based on the needs of a particular conference provider; for example—an audio-only provider may require less computing resources to record, and an appropriate (less expensive) recording system may be consequently launched.

Alternate Embodiments.

As an alternative to using keyboard and mouse emulation, alternate embodiments may examine or modify registry entries, configuration files, or internal database files of the conference software to gather or provide necessary information. Examples are given in Listing 5 and Listing 6.

The previous embodiment is implemented using Windows objects and UI Automation application programming interfaces, together with optical character recognition to interact in near real time with the conferencing software. Alternatively the process memory of the conferencing software, if accessible, could be examined and information extracted, e.g., the identity of the current active speaker. Alternatively such information could be gathered by intercepting communication to the server hosting the conferencing software. Alternatively, when the conferencing software runs within a web browser, the information can be gathered by scanning its document object model (DOM) and identifying the elements that contain the relevant information. The DOM can also be manipulated to emulate user interaction with the application.

In another alternative embodiment image processing methods may be used in order to understand the structure of a video presentation.

In some embodiments the virtual participant 30 (FIG. 1) may interact, using the recorder component 32 with the participants via chat messages. For example, the organizer may decide to send the recorder a message "#pause" in which case recording is suspended. More sophisticated interaction may be performed by connecting it to a back end process. For example a request from the organizer to provide details about a particular participant #details James—provide me all the details about James from a database available to the system 34.

Figure 10:
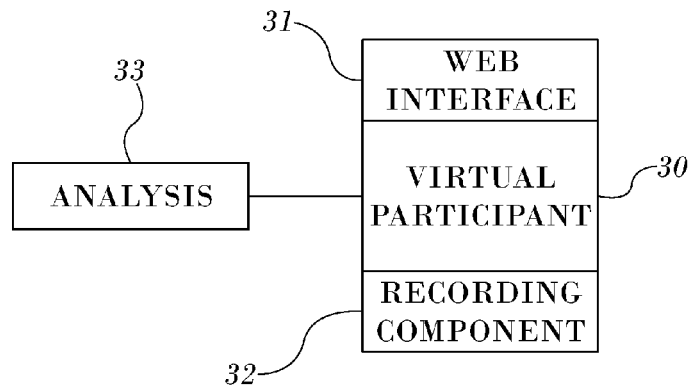
FIG. 10 is a block diagram of a portion of the system shown in FIG. 1 in accordance with an alternate embodiment of the invention.

Reference is now made to FIG. 10, which is a block diagram of a portion of the system 34 in accordance with an alternate embodiment of the invention. In this embodiment the virtual participant 30 may react to other chat messages, including commands ("quit!"; "stop recording!"), and requests for information.

Optionally, the virtual participant 30 may have an expanded role, acting as a proactive agent, i.e., a virtual administrative assistant, to obtain many types of information that may facilitate the conference, provide correlations in near real-time with prior statements of other participants, and marshal information from outside sources to empower its controller in the conference. For example, the virtual participant 30 might, upon request of its controller, or autonomously invoke a conventional search engine to identify prior inconsistent statements of another participant that were made earlier in the conference, or even made at another conference. Those skilled in the art of virtual conferencing may envision many such enhancements of the role of the virtual participant 30.

Moreover, in its role as a virtual assistant the virtual participant 30 can play pre-defined media or presentations, send reminder text messages to prospective participants, take notes to be presented in the meeting page, send email messages to human participants containing the notes and/or recorded meeting information, check availability of additional participants and ask them to join, check sound quality of the call, and provide other call-related services.

Events occurring during the conference may be submitted to an analysis module 33, for example, statements made during the conference, entrance and exit of human participants. Such items are evaluated by the analysis module 33, received in the virtual participant 30, and conclusions of the analysis module 33 or other indications of the events communicated to its controlling participant while the conference is in progress, even in near real time, along with portions of the recordings of the recorder component 32. The analysis module 33 may incorporate circuitry to implement many known methods of artificial intelligence to assist its operation. Specifically, the functionality including the virtual participant receiving voice or chat commands and responding by voice or chat messages employs voice recognition/generation methods and natural language processing (NLP) methods.

In one mode of operation the virtual participant 30 and the analysis module 33 may implement rules regarding conference events, which when triggered cause alerts to be transmitted to one or more of the human participants.

Other Implementation Details.

Listing 3 illustrates modifying the registry to insert the name of a current virtual participant.

Listing 4 illustrates spawning a transmitter-receiver for a virtual participant in a separate process.

Listing 5 illustrates joining a Zoom meeting by a virtual participant.

Listing 6 illustrates one way of controlling a web browser for use by a virtual participant.

Listing 7 is a code fragment that enables a web browser to access the audio stream of the computer hosting the conferencing software 28 (FIG. 1).

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

COMPUTER PROGRAM LISTINGS

Listing 1

```
<?xml version="1.0" encoding="UTF-8"?>
<serv:message xmlns:xsi="http://www.w3.org/2001/XMLSchema-
instance" xmlns:serv="http://www.webex.com/schemas/2002/06/service"
xmlns:th="http://www.thymeleaf.org"
xmlns:extra="http://www.honeyfy.com/extra">
<!--/*@thymesVar id="startFrom" type="java.lang.String"*/-->
<!--/*@thymesVar id="maxItems" type="java.lang.Integer"*/-->
<!--/*@thymesVar id="startDateTime" type="java.lang.String"*/-->
<header th:include="tl/webexintegration/header.xml::header"></header>
<body>
<bodyContent type="java:com.webex.service.binding.meeting
.          LstsummaryMeeting" extra:attrnamespace="type=xsi">
<listControl th:if="${maxItems != null}">
<startFrom th:if="${startFrom}"
        th:text="${startFrom}">1</startFrom>
<maximumNum th:text="${maxItem}">50</maximumNum>
</listControl>
<order>
<orderBy>STARTTIME</orderBy>
<orderAD>ASC</orderAD>
</order>
<dateScope>
<startDateStart th:text="${startDateTime}"></startDateStart>
</dateScope>
</bodyContent>
</body>
</serv:message>
```

Listing 2

```
private final IUIAutomationCondition IS_AUDIO_CONNECTION =
        createNameCondition("Audio Connection");
private final IUIAutomationCondition IS_CLOSE =
createNameCondition("Close");
private final IUIAutomationCondition IS_OK =
createNameCondition("OK");
default IUIAutomationCondition
        createNameCondition(String uiAutomationPropertyName) {
                return createPropertyCondition
                        (PropertyID.UIA_NamePropertyId,
                        uiAutomationPropertyName);
}
default IUIAutomationCondition
        createPropertyCondition(int propertyId, String value) {
                return getUIAutomation( ).createPropertyCondition(propertyId,
                        value);
}
private boolean closeAudioConnectionPopup( ) {
        final IUIAutomationElement audioConnectionPopup =
                findFirstChild(meetingWindowElement,
                IS_AUDIO_CONNECTION);
        if (audioConnectionPopup != null) {
                logger.warn(INTERRUPTION_MESSAGE,
                        MethodNameGetter.getMethodName( ));
                return findAndClick(audioConnectionPopup, IS_CLOSE, "close
                button", 2) || findAndClick(audioConnectionPopup, IS_OK,
                "OK button", 2);
        }
        return false;
}
```

Listing 3

```
WindowsRegistry.set
        ("HKEY_CURRENT_USER\\Software\\Citrix\\GoToMeeting\\UI",
        "remMyN", participantName, logger);
WindowsRegistry.set
        ("HKEY_CURRENT_USER\\Software\\Citrix\\GoToMeeting\\UI",
        "remMyE", participantEmail, logger);
WindowsRegistry.set
        ("HKEY_CURRENT_USER\\Software\\Citrix\\GoToMeeting\\UI",
        "remShowScreenNameEmailDialog", UnsignedLong.ZERO,
        logger);
// keep the side-bar always on top of other windows
WindowsRegistry.set
        ("HKEY_CURRENT_USER\\Software\\Citrix\\GoToMeeting\\UI",
        "remAttendeeViewerAlwaysInFront", UnsignedLong.ONE,
        logger);
WindowsRegistry.set("HKEY_CURRENT_USER\\Software\\Citrix\\
        GoToMeeting", "QuickConnect","true",logger);
WindowsRegistry.set("HKEY_CURRENT_USER\\Software\\Citrix\\
        GoToMeeting", "RunAtLogon","false",logger);
WindowsRegistry.set("HKEY_CURRENT_USER\\Software\\Citrix\\
        GoToMeeting\\ Audio","remJoinMuted","true",logger);
```

Listing 4

```
ImmutableList.Builder<String> cmdLine = new ImmutableList.Builder
<String>( )
        .add(ffmpegPath.toString( ))
        .add("-f")
        .add("gdigrab")
        .add("-draw_mouse")
        .add("0");
cmdLine.add("-y") // yes confirmation
        .add("-r") // recording frame rate
        .add("12") // fps
        .add("-i") // input desktop
        .add("desktop")
        .add("-r") // grabbing frame rate
        .add("12") // fps
        .add("-f")
```

Listing 4
-continued

```
        .add("dshow")
        .add("-i") // audio input:
        .add("audio=" + audioInputDeviceName)
        .add("-vcodec") // video codec:
        .add("libx264") // H.264
        .add("-pix_fmt") // pixel format:
        .add("yuv420p") // YUV (rather than RGB)
        .add("-tune") // performance tuning:
        .add("stillimage") // suitable for slides/demos
        .add("-preset") // compression algorithm required CPU
consumption/speed
        .add("ultrafast")
        .add("-qp") // enabling loss-less video
        .add("0") // as recommended over -crf by
        https://trac.ffmpeg.org/wiki/Encode/H.264
        .add("-acodec") // audio codec:
        .add("flac") // loss-less flac
        .add("-compression_level")
        .add("4") // reasonable compression level
        .add("-ar") // sampling rate:
        .add("16000") // 16 kHz
        .add("-ac") // audio channels:
        .add("1") // mono
        .add(String.valueOf(maxDuration))
        .add(outputVideoPath.toString( ));
```

Listing 5

```
/**
 * Create zoom app meeting join URI based on
 * <a href="https://support.zoom.us/hc/en-us/articles/202531535-Client-
Installation">Article</a>
 *
 * @param participantName The participant name to use
 * @param meetingNumber The number of the meeting to join
 * @return App URI to join the meeting
 */
private String createZoomAppJoinUri(String participantName, String
meetingNumber, Optional<String> optionalMeetingPassword) {
        final UriComponentsBuilder uriComponentsBuilder =
UriComponentsBuilder.newInstance( );
        uriComponentsBuilder
                .scheme("zoommtg")
                .host("zoom.us")
                .path("join")
                .queryParam("action", "join")
                .queryParam("confno", meetingNumber)
                .queryParam("uname", participantName);
        optionalMeetingPassword.ifPresent(password ->
                uriComponentsBuilder.queryParam("pwd", password));
        return uriComponentsBuilder.toUriString( );
}
```

Listing 6

```
private ChromeDriverExecutorService
startChromeBrowserWithSeleniumDriver(Path chromeDriverLocation,
ChromeDriverExecutorService.HttpResponseFilter httpResponseFilter,
Map<String, Object> connectorParams) {
        final Optional<ChromeDriverExecutorService.ProxySettings>
optionalProxySettings = isProxyEnabled(connectorParams) ?
                Optional.of(new ChromeDriverExecutorService.ProxySettings(
                        9000,
Paths.get("com/honeyfy/connectors/GoToMeetingWebConnector/Proxy/
proxy.pac.js"),
                        httpResponseFilter)) :
                Optional.empty( );
        try {
                return new ChromeDriverExecutorService(
                        chromeDriverLocation,
"com/honeyfy/connectors/GoToMeetingWebConnector/Chrome/Profile",
```

Listing 6 -continued

```
        traceFilesPath,
        optionalProxySettings,
        Connector.MDC_FORWARDING_KEYS);
    } catch (WebDriverException e) {
        throw new FallbackConnector.RetryableException(null, this.
getClass( ), "Failed to launch Chrome", e);
    }
}
```

Listing 7

```
{
    {...
    ...
        "profile" : {
        "default_apps_install_state" : 3,
        "content_settings" : {
            "exceptions" : {
                "media_stream_mic" : {
                    " https://app.gotomeeting.com:443,
                    *" : { "setting" : 1
                }
            }
        }
        "default_content_setting_values" : {
        "automatic_downloads" :
        }
    }
}
```

The invention claimed is:

1. A method of conference recording, comprising the steps of:
    identifying a plurality of virtual conferences being operated by a conferencing system connected to a communications network, the virtual conferences having human participants;
    executing a plurality of virtual participant processes in a processor;
    registering the virtual participant processes with the conferencing system as co-participants in the virtual conferences by using a recorder component of the virtual participant processes to emulate human interactions with a user interface of the conferencing system;
    recording information streams of the human participants using the virtual participant processes;
    executing a recording component process, wherein the recording component process is cooperative with the virtual participant processes to receive the information streams, wherein the virtual participant processes are operative to record an event occurring in the virtual conferences and to communicate with one or more of the human participants responsively to the event; and
    during the virtual conferences transmitting an output of the recording component process to one or more of the human participants, wherein the output of the recording component process is accessible during the virtual conferences to entities that are not participants in the virtual conferences.

2. The method according to claim 1, wherein executing a plurality of virtual participant processes comprises:
    spawning a virtual machine in the processor; and
    executing the virtual participant processes in the virtual machine.

3. The method according to claim 1, wherein the steps of registering the virtual participant processes and transmitting an output of the recording component are performed via a communication on a wired or mobile telephone connection between the conferencing system and the human participants.

4. The method according to claim 1, wherein the virtual participant processes are operative to execute a response to commands from one of the human participants.

5. The method according to claim 4, wherein the response comprises a transmission of at least one of a sound notification, a textual notification, and a report of requested information.

6. The method according to claim 5, wherein the transmission is performed via a communication on a wired or mobile telephone connection between the conferencing system and the human participants.

7. The method according to claim 1, wherein the human participants include a dynamically selected active speaker, the method further comprising the steps of:
    with the virtual participant processes identifying the active speaker; and
    associating a current one of the information streams with the active speaker.

8. The method according to claim 7, wherein the conferencing system is operative to generate an indication of the active speaker, and identifying the active speaker comprises recognizing the indication.

9. A method of conference recording, comprising the steps of:
    identifying a plurality of virtual conferences being operated by a conferencing system connected to a communications network, the virtual conferences having human participants;
    executing a plurality of virtual participant processes in a processor;
    registering the virtual participant processes with the conferencing system as co-participants in the virtual conferences; and
    recording information streams of the human participants using the virtual participant processes, wherein registering the virtual participant processes is performed by modifying at least one of a registry entry, a configuration file, and an internal database in the conferencing system.

10. The method according to claim 1, wherein the virtual participant processes are operative for recording information streams in a plurality of multimedia channels, further comprising combining the recorded information streams into a common stream.

11. A system comprising:
    a server connected to a communications network;
    a recording component linked to the server, the server operative for:
    identifying a plurality of virtual conferences being operated by a conference server connected to the communications network, the virtual conferences having human participants;
    spawning a virtual machine;
    executing a plurality of virtual participant processes in the virtual machine; and
    registering the virtual participant processes with the conference server as co-participants in the virtual conferences, wherein the recording component is cooperative with the server for recording information streams of the human participants using the virtual participant processes, and wherein an output of the recording component is accessible during the virtual conferences to entities that are not participants in the virtual conferences.

12. The system according to claim 11, wherein the steps of registering the virtual participant processes and recording information streams are performed via a communication on a wired or mobile telephone connection between the server and the human participants.

13. The system according to claim 11, wherein the server is operative during the virtual conferences for transmitting an output of the recording component to one or more of the human participants.

14. The system according to claim 11, wherein the server is operative for:
obtaining a schedule of the virtual conferences;
spawning respective virtual machines to provide virtual participant processes for a portion of the virtual conferences in the schedule;
monitoring performance of the virtual machines during the virtual conferences to detect flaws in the virtual machines; and
responsively to a detection of a failure of one of the virtual machines to perform in accordance with a predefined standard, terminating the one virtual machine and launching a replacement virtual machine.

15. The system according to claim 14 wherein the server is operative for:
determining that one of the virtual conferences has completed; and
thereafter reassigning the virtual machine thereof to a new conference.

16. The method according to claim 1, wherein executing a plurality of virtual participant processes comprises:
spawning a virtual machine in the processor, the virtual machine comprising an instance of a virtual operating system, and
executing the virtual participant processes in the virtual machine.

17. The system according to claim 11, wherein the server is configured for registering the virtual participant processes by emulating human interactions with a user interface of the conference server.

18. The method according to claim 9, wherein registering the virtual participant processes is performed by emulating human interactions with a user interface of the conferencing system.

* * * * *